: US012223678B2

(12) United States Patent
Galetti

(10) Patent No.: US 12,223,678 B2
(45) Date of Patent: *Feb. 11, 2025

(54) NAVIGATION SYSTEM AND METHOD

(71) Applicant: The Boeing Company, Arlington, VA (US)

(72) Inventor: Ralph R. Galetti, Albuquerque, NM (US)

(73) Assignee: The Boeing Company, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/522,625

(22) Filed: Nov. 29, 2023

(65) Prior Publication Data
US 2024/0095952 A1 Mar. 21, 2024

Related U.S. Application Data

(63) Continuation of application No. 17/496,339, filed on Oct. 7, 2021, now Pat. No. 11,869,214.

(60) Provisional application No. 63/138,578, filed on Jan. 18, 2021.

(51) Int. Cl.
*H04N 23/90* (2023.01)
*G06T 7/73* (2017.01)
(52) U.S. Cl.
CPC .............. *G06T 7/74* (2017.01); *H04N 23/90* (2023.01); *G06T 2207/30252* (2013.01)

(58) Field of Classification Search
CPC ....... B64C 39/024; B64C 19/00; B64C 25/10; B64C 27/08; B64C 39/02; B64C 25/52; B64C 2025/008; B64C 25/12; B64C 25/24; B64C 25/34
USPC ........................................................ 348/116
See application file for complete search history.

(56) References Cited

U.S. PATENT DOCUMENTS

2019/0370983 A1\* 12/2019 Zhou ......................... G06T 7/60
2022/0150417 A1\* 5/2022 Bramlett ................... G06T 7/70

\* cited by examiner

*Primary Examiner* — Masum Billah
(74) *Attorney, Agent, or Firm* — Harrity & Harrity, LLP

(57) ABSTRACT

A navigation system for one or more vehicles includes: a first camera configured to observe the vehicle(s) and first and second reference points within a first field of view, wherein the first and second reference points have first and second known spatial positions, respectively, the first camera being further configured to produce a first output signal from observation of the observed vehicle(s) and reference points; a second camera configured to observe the vehicle(s) and reference points within a second field of view, the second camera being further configured to produce a second output signal from observation of the observed vehicle(s) and reference points; and a processor operatively connected with the first and second cameras and configured to determine a respective spatial position for each vehicle(s) from the first and second output signals and from known first and second camera spatial positions of the first and second cameras.

19 Claims, 8 Drawing Sheets

NAVIGATION SYSTEM AND METHOD

CROSS-REFERENCE TO RELATED APPLICATIONS

The present application is a continuation application of U.S. patent application Ser. No. 17/496,339 filed on Oct. 7, 2021, which is a non-provisional of and claims priority to, and the benefit of, U.S. Provisional Patent Application No. 63/138,578 filed on Jan. 18, 2021, the entire disclosure of which is incorporated by reference herein.

INTRODUCTION

This disclosure relates generally to systems and methods of navigation for one or more vehicles located within a control volume.

Global positioning systems (GPS) may be used for navigation and geo-location in a wide variety of applications, including aircraft, surface watercraft, automotive vehicles and personal cell phones. However, GPS signals are not available or reliable in some environments, such as the "urban canyon" environments of large cities where tall buildings may obstruct GPS signals. GPS can also be electronically jammed, may not work reliably at high latitudes, and occasionally suffers drop-outs and periods of interrupted service.

Some alternatives to GPS systems are available, such as on-board radar, infrared camera systems and the like, but such alternatives tend to be heavy and expensive.

SUMMARY

According to one embodiment, a navigation system for one or more vehicles located within a control volume includes a first camera, a second camera and a processor. The first camera is configured to observe the one or more vehicles and first and second reference points within a first field of view, wherein the first and second reference points have first and second known spatial positions, respectively, the first camera having a known first camera spatial position and being further configured to produce a first output signal from the observed one or more vehicles and the first and second reference points. The second camera is configured to observe the one or more vehicles and the first and second reference points within a second field of view, the second camera having a known second camera spatial position and being further configured to produce a second output signal from the observed one or more vehicles and the first and second reference points, The processor is operatively connected with the first and second cameras and is configured to determine a respective spatial position for each of the one or more vehicles from the first and second output signals and from the known first and second camera spatial positions.

Each of the known first and second camera spatial positions may be a respective set of x, y and z coordinates. Additionally or alternatively, each of the first and second known spatial positions may be a respective set of x, y and z coordinates. Further, each of the first and second known spatial positions may be known with respect to an origin located within the control volume.

The navigation system may further include: a first real-time tracking system operatively connected with the first camera for determining respective first two-dimensional coordinates of each of the one or more vehicles using the first output signal, the first and second known spatial positions, and the known first camera spatial position; and a second real-time tracking system operatively connected with the second camera for determining respective second two-dimensional coordinates of each of the one or more vehicles using the second output signal, the first and second known spatial positions, and the known second camera spatial position.

Each of the first and second cameras may be configured to detect at least one of visible light, infrared light and ultraviolet light. Additionally or alternatively, the first and second cameras may be disposed such that their respective fields of view are generally orthogonal with each other.

Each of the first and second reference points may be (i) a respective point on a respective physical object disposed within the control volume and/or (ii) a respective focal point of a respective reference point beacon disposed within the control volume.

The first output signal may be representative of a first two-dimensional image of the control volume as viewed from the first camera, and the second output signal may be representative of a second two-dimensional image of the control volume as viewed from the second camera.

The navigation system may also include a transmitter operatively connected with the processor and configured to transmit one or more messages into the control volume, wherein the one or more messages contain a respective set of three-dimensional spatial coordinates for each of the one or more vehicles.

The navigation system may additionally include a respective vehicle beacon configured to be carried aboard each of the one or more vehicles, wherein each vehicle beacon is configured to transmit a respective vehicle identification.

In this embodiment, the one or more vehicles and the control volume may be, respectively: one or more aircraft and a landing zone including a first airspace above the landing zone; one or more ground vehicles and an area of terrain including a second airspace above the terrain; one or more surface watercraft and a region of open water including a third airspace above the open water; one or more submersible watercraft and a volume of navigable water; or one or more spacecraft and a volume of navigable space.

According to another embodiment, a system for one or more vehicles located within a control volume includes: (i) a first camera configured to observe the one or more vehicles and first and second reference points within a first field of view, wherein the first and second reference points have first and second known spatial positions, respectively, wherein each of the first and second known spatial positions is known with respect to an origin located within the control volume, the first camera having a known first camera spatial position and being further configured to produce a first output signal from the observed one or more vehicles and the first and second reference points, wherein the first output signal is representative of a first two-dimensional image of the control volume as viewed from the first camera; (ii) a second camera configured to observe the one or more vehicles and the first and second reference points within a second field of view, the second camera having a known second camera spatial position and being further configured to produce a second output signal from the observed one or more vehicles and the first and second reference points, wherein the second output signal is representative of a second two-dimensional image of the control volume as viewed from the second camera; (iii) a processor operatively connected with the first and second cameras and configured to determine a respective spatial position for each of the one or more vehicles from the first and second output signals and from the known first and second camera spatial positions; and (iv) a transmitter operatively connected with the processor and configured to transmit one or more messages into the control volume, wherein the one or more messages contain a respective set of three-dimensional spatial coordinates for each of the one or more vehicles.

In this system, the first and second cameras may be disposed such that their respective fields of view are generally orthogonal with each other.

The system may further include a respective vehicle beacon configured to be carried aboard each of the one or more vehicles, wherein each vehicle beacon is configured to transmit a respective vehicle identification.

The system may also include: a first real-time tracking system operatively connected with the first camera for determining respective first two-dimensional coordinates of each of the one or more vehicles using the first output signal, the first and second known spatial positions, and the known first camera spatial position; and a second real-time tracking system operatively connected with the second camera for determining respective second two-dimensional coordinates of each of the one or more vehicles using the second output signal, the first and second known spatial positions, and the known second camera spatial position.

According to yet another embodiment, a method of navigation for one or more vehicles located within a control volume includes: (i) observing, with a first camera having a known first camera spatial position, the one or more vehicles and first and second reference points within a first field of view, wherein the first and second reference points have first and second known spatial positions, respectively; (ii) producing, by the first camera, a first output signal from the observed one or more vehicles and the first and second reference points; (iii) observing, with a second camera having a known second camera spatial position, the one or more vehicles and the first and second reference points within a second field of view; (iv) producing, by the second camera, a second output signal from the observed one or more vehicles and the first and second reference points; and (v) determining, by a processor operatively connected with the first and second cameras, a respective spatial position for each of the one or more vehicles from the first and second output signals and from the known first and second camera spatial positions.

The method may also include: determining respective first two-dimensional coordinates of each of the one or more vehicles using the first output signal, the first and second known spatial positions, and the known first camera spatial position; and determining respective second two-dimensional coordinates of each of the one or more vehicles using the second output signal, the first and second known spatial positions, and the known second camera spatial position.

The method may additionally include: transmitting one or more messages into the control volume, wherein the one or more messages contain a respective set of three-dimensional spatial coordinates for each of the one or more vehicles. The method may further include receiving a respective vehicle identification transmitted from a respective vehicle beacon carried aboard each of the one or more vehicles.

The above features and advantages, and other features and advantages, of the present teachings are readily apparent from the following detailed description of some of the best modes and other embodiments for carrying out the present teachings, as defined in the appended claims, when taken in connection with the accompanying drawings.

DETAILED DESCRIPTION

Figure 1:
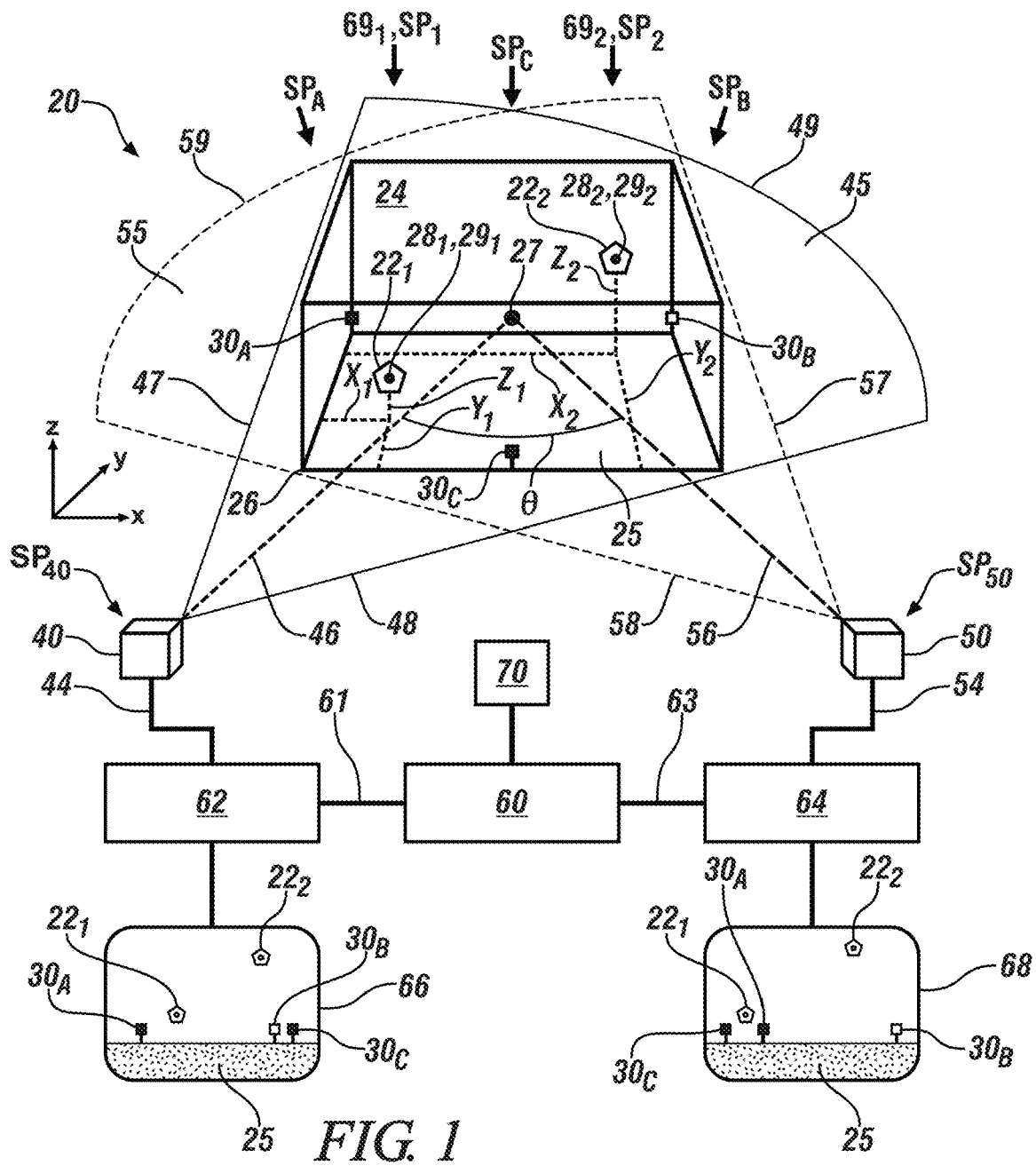
FIG. 1 is a front perspective schematic view and block diagram of first and second embodiments of a navigation system.

Referring now to the drawings, wherein like numerals indicate like parts in the several views, a navigation system 20 for one or more vehicles 22 located within a control volume 24, and a method 100, 200 of navigation for one or more vehicles 22 located within a control volume 24, are shown and described herein. The navigation system 20 and method 100, 200 are described below in multiple embodiments, each of which is effective for determining the spatial position SP (e.g., three-dimensional spatial coordinates 69) of each of the one or more vehicles 22 within the control volume 24, which may be used for navigation, collision avoidance, trajectory planning, traffic control and the like.

The navigation system 20 and method 100, 200 provide GPS-like navigation information which may be useful in environments where GPS is not available or not reliable (such as "urban canyon" environments in cities). Additionally or alternatively, the navigation system 20 and method 100, 200 may serve as a complementary, supplemental or redundant back-up system to GPS and other geo-location systems.

Note that certain reference numerals in the drawings have subscripts, such as the two vehicles $22_1$ and $22_2$ in FIGS. 1 and 3-7. Subscripts are used in the drawings and in the present description to refer to individual elements (such as the aforementioned vehicles), while the use of reference numerals without subscripts may refer to the collective group of such elements and/or to a singular but generic one of such elements. Thus, reference numeral $22_1$ refers to a specific vehicle, while reference numeral 22 (without the subscript) may refer to all the vehicles, the group of vehicles, or a singular but generic vehicle (i.e., any vehicle).

Figure 10A:
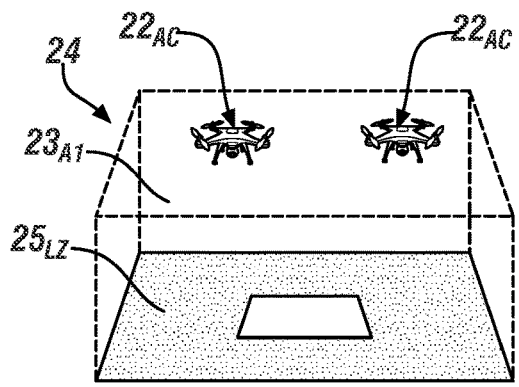
FIGS. 10A-E are schematic perspective views of the vehicles and control volume of FIGS. 1 and 3-7, specifically: aircraft and a landing zone; ground vehicles and an area of terrain; surface watercraft and a region of open water; submersible watercraft and a volume of navigable water; and spacecraft and a volume of navigable space.
Figure 10B:
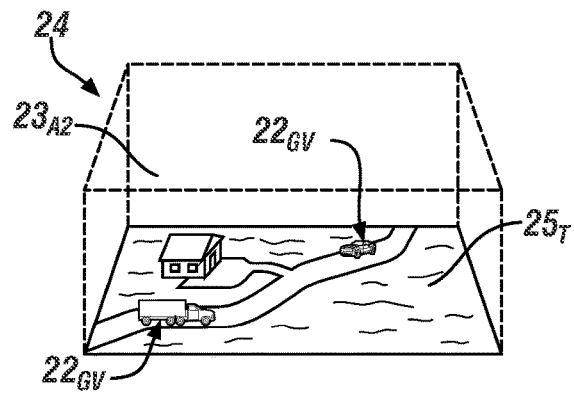
Figure 10C:
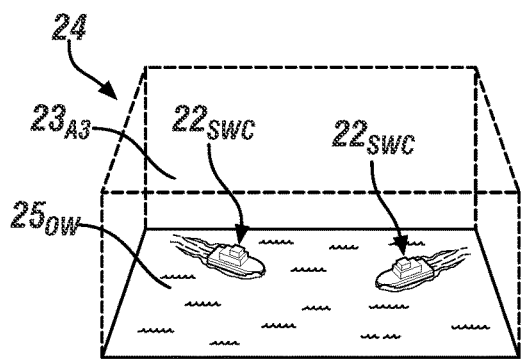
Figure 10D:
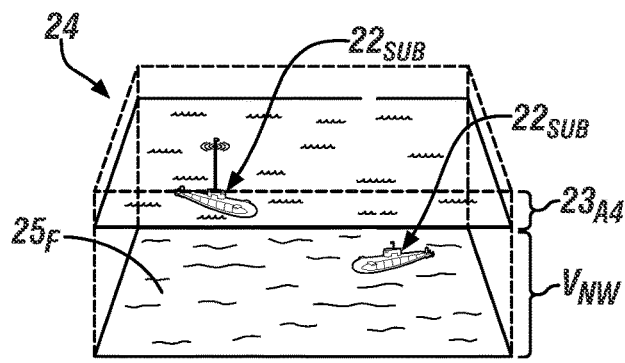
Figure 10E:
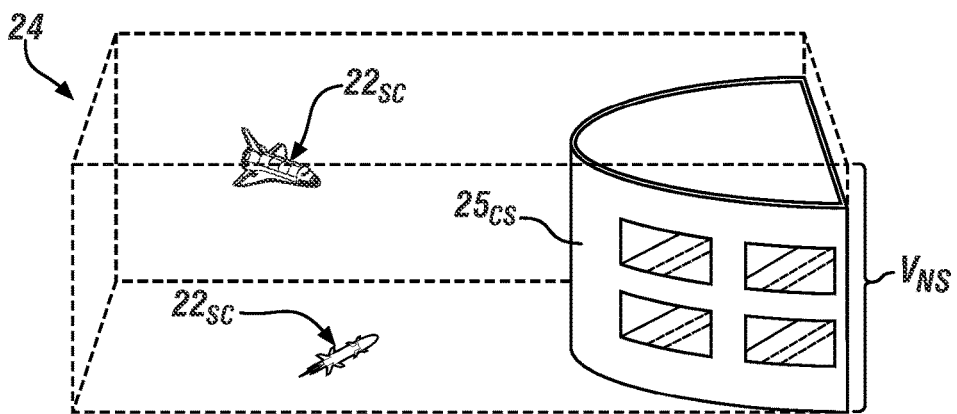

The control volume 24 is represented in the drawings as a rectangular volume, but other volumetric shapes may also be used. Each of the vehicles 22 is represented in the drawings as a small pentagon having a center or centroid 28, at which an optional time-modulated beacon or transponder 29 may be carried. (Such beacons 29 may also be carried at locations other than the vehicle centroid 28, such as on the vehicle's exterior.) The vehicles 22 and control volume 24 are described herein in an exemplary manner as being, respectively, one or more aircraft (e.g., fixed-wing, rotary-wing, drones, etc.) $22_{AC}$, and a landing zone or runway $25_{LZ}$ including a first airspace $23_{A1}$ above the landing zone $25_{LZ}$ (FIG. 10A). However, the one or more vehicles 22 and the control volume 24 may assume various other configurations, such as: (i) one or more ground vehicles $22_{GV}$ and an area of terrain $25_T$ including a second airspace $23_{A2}$ above the terrain $25_T$ (FIG. 10B); (ii) one or more surface watercraft $22_{SWC}$ and a region of open water having a surface $25_{OW}$ and including a third airspace $23_{A3}$ above the open water surface $25_{OW}$ (FIG. 10C); (iii) one or more submersible watercraft $22_{SUB}$ and a volume of navigable water $V_{NW}$, optionally including an open water surface $25_{OW}$, a fourth airspace $23_A$ above the water surface $25_{OW}$, and/or a sea floor, river bed or other ground plane $25_F$ beneath the volume of water $V_{NW}$ (FIG. 10D); or (iv) one or more satellite or other spacecraft $22_{SC}$ and a volume of navigable space $V_{NS}$, optionally including one or more control surfaces $25_{CS}$ (e.g., the outer surface of a space station, asteroid, etc.) which the spacecraft $22_{SC}$ may be engaged with (FIG. 10E). Note that the drawings herein are schematic in nature and are not necessarily drawn to scale.

As illustrated in FIGS. 1, 3-5 and 10A-E, the control volume 24 may have a surface 25 therein, such as the ground (in the case of an airspace), the surface above a body of water, or a sea floor, river bed or the like beneath a volume of water. This surface 25 may be flat and smooth, or uneven and undulating. The control volume 24 may also contain an origin or zero point 26 from which position coordinates may be measured for vehicles 22 and other objects within the control volume 24. The origin or zero point 26 may correspond to a physical landmark or other physical object within the control volume 24, or it may be an arbitrarily assigned point in space within the control volume 24. From this origin or zero point 26, the respective x, y and z coordinates of other objects within the control volume 24 (e.g., vehicles 22 and reference points 30) may be determined. For example, as illustrated in FIG. 1, the origin 26 may be defined at the front lower left corner of the control volume 24, with the x, y and z coordinates of a first vehicle $22_1$ being $(x_1, y_1, z_1)$ and of a second vehicle $22_2$ being $(x_2, y_2, z_2)$. As other examples, the origin 26 may be a landing point on the ground, a landing point on a building or other structure, a landing point on a vehicle 22, a docking point or dock in a port, and the like. Thus, the origin 26 may be the intended destination or landing/docking point for one or more vehicles 22, and the x, y and z axes and coordinates may be defined as extending from the origin 26. Note that prior to implementation of the navigation system 20 and method 100, 200, the x, y and z coordinates of the one or more of the vehicles 22—and perhaps of all of the vehicles 22—are not known, but may be determined by use of the navigation system 20 and method 100, 200.

The control volume 24 may also contain first and second reference points $30_A$, $30_B$, and optionally a third reference point $30_C$. (Alternatively, one or more of these reference points 30 may be disposed outside of the control volume 24, as further discussed below.) Each of these reference points $30_A$, $30_B$, $30_C$ has a respective known spatial position $SP_A$, $SP_B$, $SP_C$, each of which may be represented by a respective set of x, y and z coordinates (e.g., as measured from or defined with respect to the origin 26). Each of the first, second and third known spatial positions $SP_A$, $SP_B$, $SP_C$ may be known, measured or defined with respect to the origin 26, which may be located within the control volume 24 or outside the control volume 24. For example, as shown in FIG. 1, the first and second reference points $30_A$, $30_B$ may be located at the two back lower corners of the control volume 24, and the third reference point $30_C$ may be located in the middle of the front lower edge of the control volume 24, with all three reference points $30_A$, $30_B$, $30_C$ being elevated just slightly above the surface or ground 25. Each of the reference points $30_A$, $30_B$, $30_C$ may be (i) a respective point 31 on a respective physical object 39 disposed within the control volume 24, and/or (ii) a respective focal point 38 of a respective reference point beacon 32 disposed within the control volume 24. The known spatial positions $SP_A$, $SP_B$, $SP_C$ of the reference points $30_A$, $30_B$, $30_C$ may be known, measured or defined relative to an Earth-oriented inertial reference frame, or to any arbitrary inertial reference frame, which may be stationary with respect to the Earth (such as a helipad on the roof of a building) or moving (such as a helipad on a boat floating/moving on the surface of a body of water).

Figure 2:
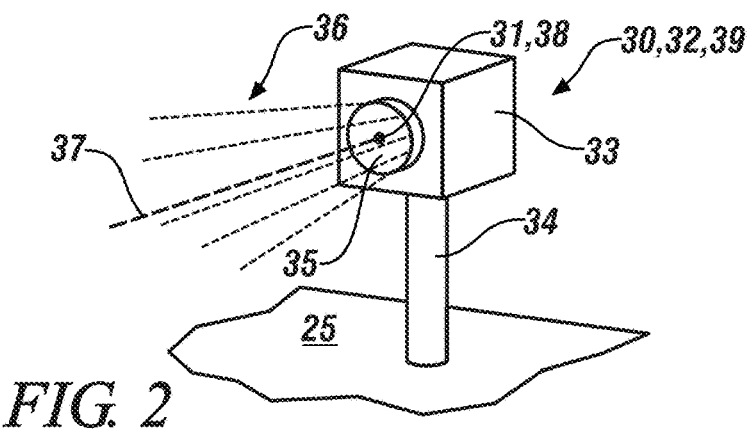
FIG. 2 is a perspective schematic view of a reference point beacon, emitter or reflector.

FIG. 2 shows a perspective schematic view of a reference point beacon, emitter or reflector 32 (hereinafter referred to as a "beacon/reflector") which may be used for each reference point 30. The beacon/reflector 32 includes body portion 33 carried atop a stand 34 which is fixed in the ground or surface 25, thus disposing the body portion 33 at a certain height above the surface 25. (Alternatively, the beacon/reflector 32 may not include a stand 34, and the body portion 33 may be disposed upon or flush with the ground surface 25.) The beacon/reflector 32 may be an "active" device which includes a lens or emitter portion 35 on the body portion 33 from which a collection of beams or rays of electromagnetic (EM) energy 36 may be directed (such as visible light, microwave energy, etc.). In the case of an active beacon/reflector 32, the EM energy 36 may be emanating continuously or in pulses. On the other hand, the beacon/reflector 32 may be a "passive" device which includes a mirror or reflector portion 35 on the body portion 33 which easily reflects EM energy 36. The lens/emitter portion/mirror/reflector portion 35 may be configured such that the rays of emanated or reflected EM energy 36 may be characterized by a central axis, beam or ray 37 extending from a focal point 38 centrally located on the lens/emitter portion/mirror/reflector portion 35. Alternatively, the beacon/reflector 32 may be an ordinary physical object 39 (e.g., a boulder, sign or landmark) which is disposed within (or even outside of) the control volume 24 and which may serve as a convenient reference point 30. In any case, a particular point 31 on the beacon/reflector 32 may be used as the specific and precise location of the reference point 30.

FIG. 1 illustrates a first embodiment of the navigation system 20 for one or more vehicles 22 located within a control volume 24. The navigation system 20 includes a first camera or receiver 40 configured to observe the one or more vehicles 22 and the first, second and third reference points $30_A$, $30_B$, $30_C$ within a first field of view 45, wherein the first, second and third reference points $30_A$, $30_B$, $30_C$ have first, second and third known spatial positions $SP_A$, $SP_B$, $SP_C$, respectively. The first camera 40 is further configured to produce a first output signal 44 from observation of the observed vehicles 22 and reference points 30. The navigation system 20 also includes a second camera or receiver 50 configured to observe the vehicles 22 and reference points 30 within a second field of view 55, with the second camera 50 being further configured to produce a second output signal 54 from observation of the observed vehicles 22 and reference points 30. (For example, the first and second output signals 44, 54 may comprise video signals, a stream of still images, or the like.) Additionally, the navigation system 20 includes a processor 60 operatively connected with the first and second cameras 40, 50 and configured to determine a respective spatial position SP for each of the one or more vehicles 22 from the first and second output signals 44, 54. Thus, for example, if there are two vehicles $22_1$, $22_2$ being viewed by the first and second cameras 40, 50, then the processor 60 will determine respective spatial positions $SP_1$, $SP_2$ for the vehicles $22_1$, $22_2$. Each of these spatial positions $SP_1$, $SP_2$ may be represented by a respective set of three-dimensional coordinates $69_1$, $69_2$ such as x, y and z (or other) coordinates (e.g., as measured from the origin 26).

Each of the first and second cameras/receivers 40, 50 may be configured to detect or receive visible light, infrared light and/or ultraviolet light, as well as other wavelengths of EM energy 26 (e.g., microwaves). The first camera 40 is configured to detect first EM signals 42 within a first collection volume or field of view 45 having a first central ray or path 46, and the second camera 50 is configured to detect second EM signals 52 within a second collection volume or field of view 55 having a second central ray or path 56. The first collection volume or field of view 45 may have opposed first and second lateral edges 47, 48 and a distal extent or edge 49, which may be envisioned as somewhat of a wedge or cone shape. Likewise, the second collection volume or field of view 55 may have opposed first and second lateral edges 57, 58 and a distal extent or edge 59, which may also be envisioned as somewhat of a wedge or cone shape. However, these shapes are merely illustrative, as the first and second fields of view 45, 55 may also assume other shapes.

Each of the first and second cameras/receivers 40, 50 is configured and/or positioned to view the control volume 24 within its respective field of view 45, 55, as well as the first, second and third reference points $30_A$, $30_B$, $30_C$. While the drawings illustrate the first, second and third reference points $30_A$, $30_B$, $30_C$ as being inside of or at the outer boundary of the control volume 24, one or more of these reference points 30 may be disposed outside of the control volume 24. For example, the third reference point $30_C$ may be disposed near the location illustrated in FIGS. 1 and 3-7, but slightly outside the control volume 24 and slightly closer to the cameras 40, 50 than is illustrated in the aforementioned drawings. (I.e., the third reference point $30_C$ would be disposed slightly "in front of" the control volume 24.) In this example, the third reference point $30_C$ would still be seen within each of the two fields of view 45, 55. Likewise, one or both of the first and second reference points $30_A$, $30_B$ may be disposed near their respective locations illustrated in FIGS. 1 and 3-7, but slightly outside of and "behind" the control volume 24, and in this case, too, the first and second reference points $30_A$, $30_B$ would still be visible within each of the two fields of view 45, 55.

Note that the word "receiver", as used herein, includes any device configured to receive EM energy 26 from the control volume 24 and produce an electrical signal (e.g., output signals 44 and 54) that is representative of or provides spatial/locational information about objects disposed within the control volume 24. Thus, "receiver" include devices such as (i) cameras and imagers which are configured to form images of the objects within the control volume 24 (whether using visible light or EM energy 26 of other wavelengths), as well as (ii) rangefinders and the like which are configured to measure the distance to objects by transmitting or directing EM energy 26 (or other energy, such as sonar) at each object and receiving EM energy 26 (or other energy) in the form of a return signal back from each object. In the first and second embodiments, two cameras 40, 50 are utilized, which may provide, simulate or enable a binocular or stereoscopic view of the control volume 24.

Figure 3:
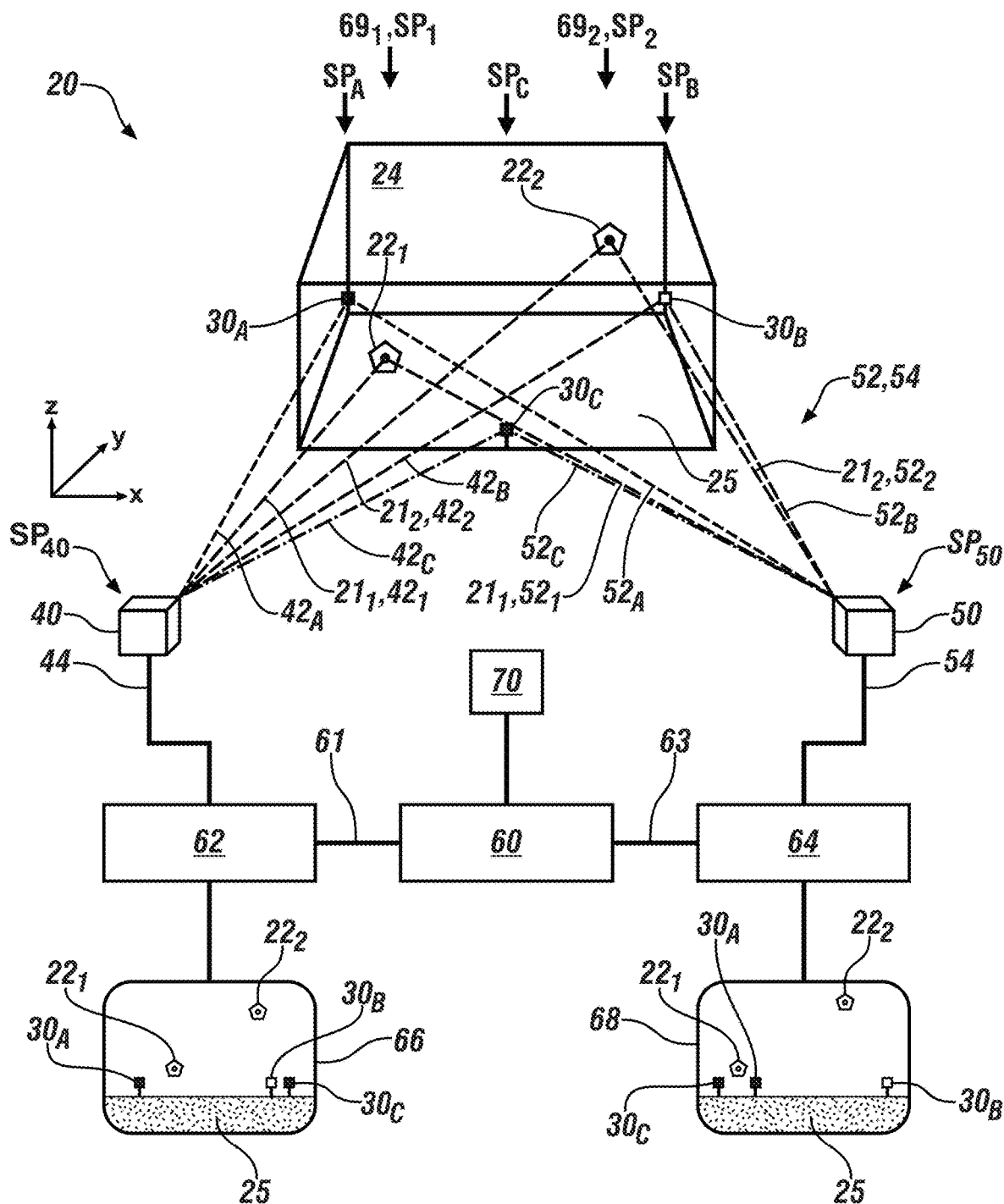
FIG. 3 is an alternative front perspective schematic view and block diagram of the configuration shown in FIG. 1.
Figure 5:
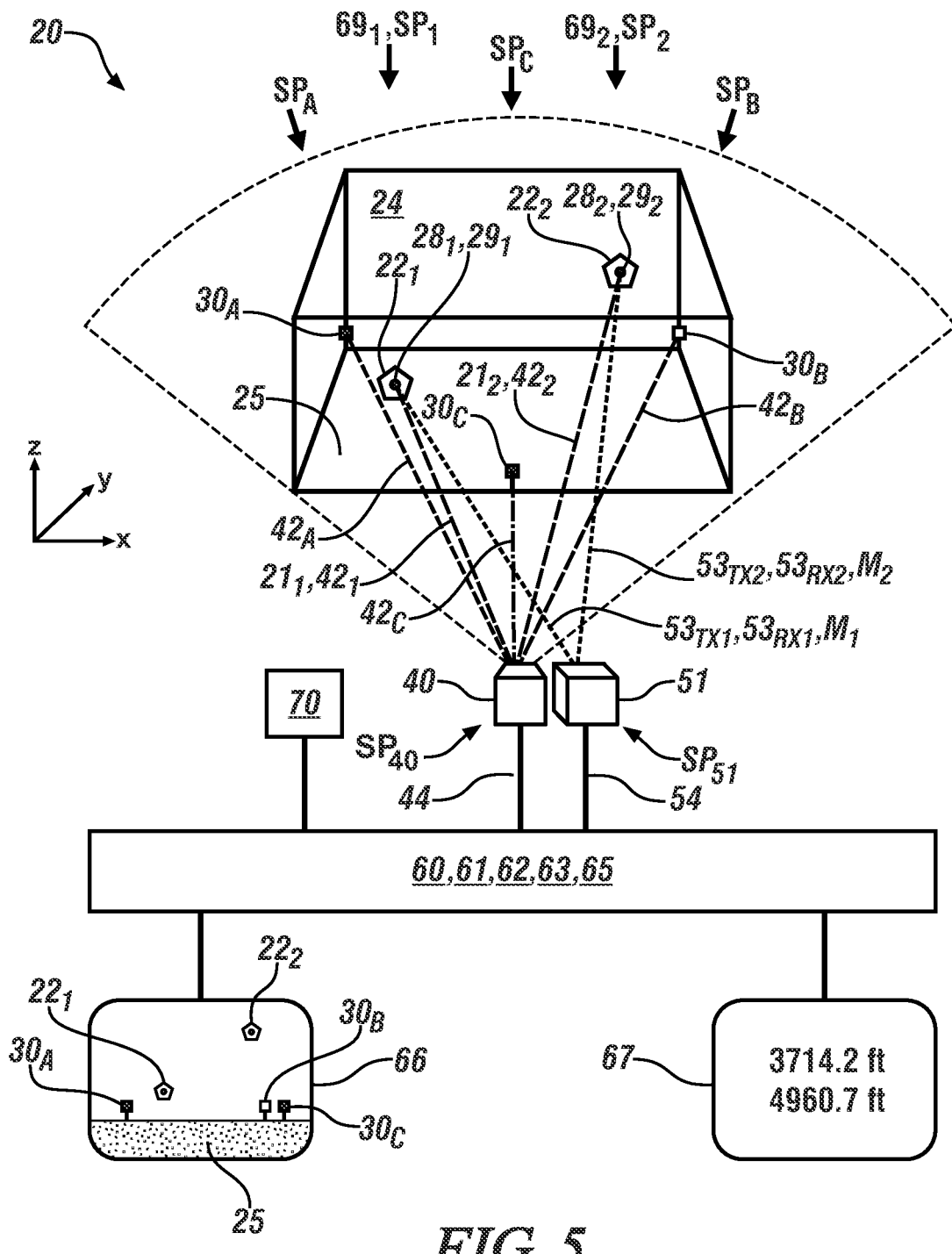
FIG. 5 is a front perspective schematic view and block diagram of an alternative configuration of the third and fourth embodiments.
Figure 6:
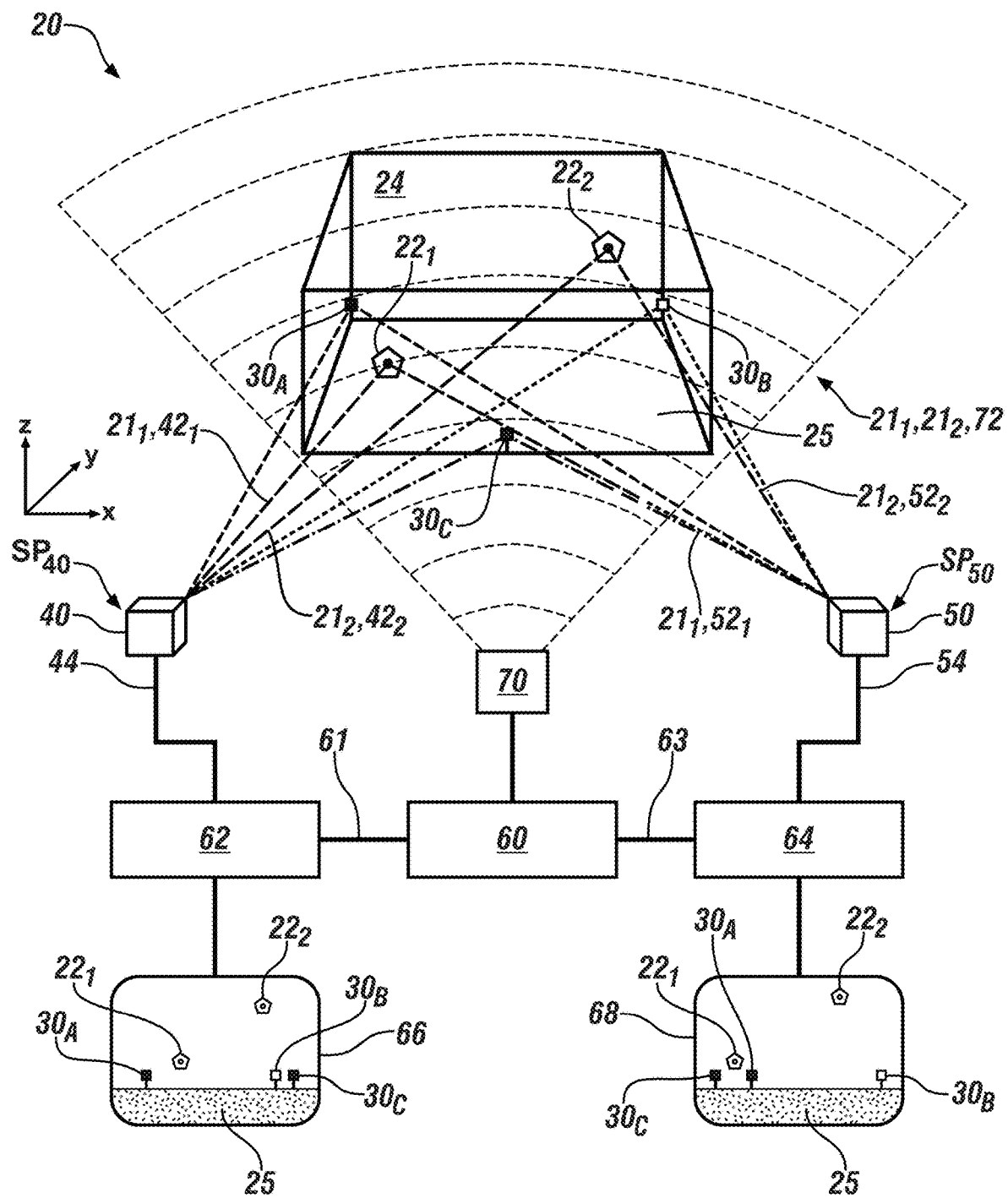
FIG. 6 is another alternative front perspective schematic view and block diagram of the first configuration shown in FIGS. 1 and 3, illustrating message broadcast.

As illustrated in FIGS. 1, 3 and 6, the first and second cameras 40, 50 may be disposed such that their respective collection volumes or fields of view 45, 55 are generally orthogonal with each other, with the first and second central rays 46, 56 meeting at a convergence point 27 and with an angle θ defined between the first and second central rays 46, 56 of approximately 90 degrees. The first EM signals 42 (which are detected by the first camera 40) are illustrated in FIGS. 1 and 3-7 as signals $42_1$, $42_2$ coming from the first and second vehicles $22_1$, $22_2$, and signals $42_A$, $42_B$, $42_C$ coming from the first, second and third reference points or beacon/emitters $30_A$, $30_B$, $30_C$. Similarly, the second EM signals 52 (which are detected by the second camera 50) are illustrated as signals $52_1$, $52_2$ coming from the first and second vehicles $22_1$, $22_2$, and signals $52_A$, $52_B$, $52_C$ coming from the first, second and third reference points or beacon/emitters $30_A$, $30_B$, $30_C$. Note that while the first and second cameras 40, 50 and reference points 30 are depicted in the drawings as being fixed, one or more of these elements may be gimbaled for rotation about one or more axes, and/or configured for translation or other motions.

The first output signal 44 may be representative of a first two-dimensional image 66 of the control volume 24 as viewed from the first camera 40, and the second output signal 54 may be representative of a second two-dimensional image 68 of the control volume 24 as viewed from the second camera 50. These images 66, 68 may be viewed together or separately on one or more monitors or other display devices, which may be connected to the processor 60, the cameras 40, 50, or the real-time tracking systems 62, 64 described below.

Figure 7:
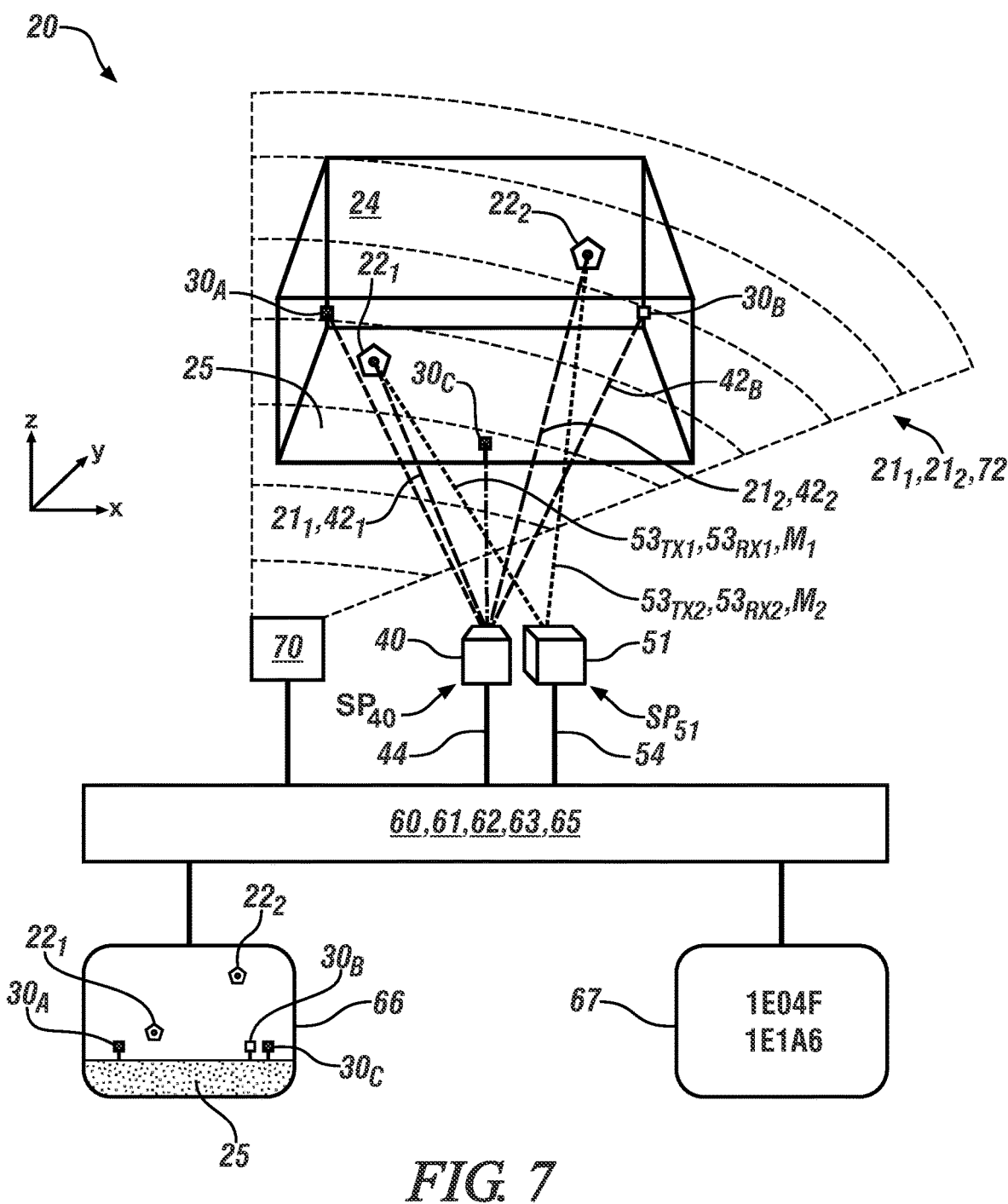
FIG. 7 is an alternative front perspective schematic view and block diagram of the third configuration shown in FIG. 5, illustrating message broadcast.

The navigation system 20 may further include (i) a first real-time tracking system 62 operatively connected with the first camera 40 for determining respective first two-dimensional coordinates 61 for each of the one or more vehicles 22 using the first output signal 44 and the first, second and third known spatial positions $SP_A$, $SP_B$, $SP_C$, and (ii) a second real-time tracking system 64 operatively connected with the second camera 50 for determining respective second two-dimensional coordinates 63 for each of the one or more vehicles 22 using the second output signal 54 and the first, second and third known spatial positions $SP_A$, $SP_B$, $SP_C$. Note that while the processor 60 and the real-time tracking systems 62, 64 are shown in FIGS. 1, 3-4 and 6 as being separate modules or elements, the functionality of the real-time tracking systems 62, 64 may be included as part of the processor 60, as illustrated in FIGS. 5 and 7.

The navigation system 20 may further include a respective vehicle beacon or transponder 29 configured to be carried aboard each of the one or more vehicles 22. Each vehicle beacon 29 may be configured to transmit or broadcast a respective vehicle identification 21, utilizing the same range of EM energy 26 which the first and second cameras 40, 50 are configured to receive. For example, a vehicle beacon $29_1$ carried aboard a first vehicle $22_1$ (e.g., at the first vehicle's centroid $28_1$, outer surface, etc.) may emit a first vehicle identification $21_1$ as a series of long and short intermittent pulses of light which serve to identify the first vehicle $22_1$, while a vehicle beacon $29_2$ carried aboard a second vehicle $22_2$ (e.g., at the second vehicle's centroid $28_2$, outer surface, etc.) may emit a second vehicle identification $21_2$ that is different from the first vehicle identification $21_1$ (and is unique to the second vehicle $22_2$) in order to identify the second vehicle $22_2$. (These pulses may be in Morse code, binary code or other format.) Optionally, the pulses of the vehicle beacon 29 may be at a wavelength just outside the visible spectrum (e.g., infrared or ultraviolet), and the cameras 40, 50 may be configured to detect this wavelength in addition to the visible spectrum.

Additionally, the navigation system 20 may further include a transmitter 70 operatively connected with the processor 60 and configured to transmit or broadcast one or more messages 72 into the control volume 24, wherein the one or more messages 72 contain a respective spatial position SP or set of three-dimensional spatial coordinates 69 for each of the vehicles 22 that are within the control volume 24. Thus, the transmitter 70 is configured to broadcast the exact spatial location of each and every vehicle 22 within the control volume 24. (This information may then be received and used by each vehicle 22, and/or by a traffic control function, in order to assist in navigation, collision avoidance, trajectory planning, traffic control and the like.) These spatial positions SP or three-dimensional spatial coordinates 69 may be expressed as x, y and z coordinates, polar coordinates, or other coordinates, and may utilize the origin 26 or other point as the coordinate origin.

In addition to including the spatial positions SP or three-dimensional spatial coordinates 69 of all the vehicles 22 within the control volume 24, the one or more messages 72 may also include the vehicle identifications 21 for all the vehicles 22. The one or more messages 72 may be sequenced and/or structured such that each vehicle identification 21 may be readily associated with its corresponding vehicle's spatial position SP or three-dimensional spatial coordinates 69. (Note that as used herein, spatial position SP and three-dimensional spatial coordinates 69 may be used interchangeably.) For example, either or both of the first and second cameras 40, 50 may receive a first vehicle identification $21_1$ from a first vehicle $22_1$, a second vehicle identification $21_2$ from a second vehicle $22_2$, and so forth, and the transmitter 70 may transmit one or more messages 72 collectively containing all the vehicle identifications ($21_1$, $21_2$, etc.) and all the vehicles' spatial locations ($SP_1$, $SP_2$, etc.) or three-dimensional spatial coordinates ($69_1$, $69_2$, etc.) in a manner in which the unique spatial locations SP or three-dimensional spatial coordinates 69 are appropriately associated with their respective vehicle identifications 21.

According to another configuration, a navigation system 20 for one or more vehicles 22 located within a control volume 24 includes: (i) a first camera 40 configured to observe the one or more vehicles 22 and first, second and third reference points $30_A$, $30_B$, $30_C$ within a first field of view 45, wherein the first, second and third reference points $30_A$, $30_B$, $30_C$ have first, second and third known spatial positions $SP_A$, $SP_B$, $SP_C$, respectively, and wherein each of the first, second and third known spatial positions $SP_A$, $SP_B$, $SP_C$ is known with respect to an origin 26 located within the control volume 24, the first camera 40 being further configured to produce a first output signal 44 from the observed vehicles 22 and reference points 30, wherein the first output signal 44 is representative of a first two-dimensional image 66 of the control volume 24 as viewed from the first camera 40; (ii) a second camera 50 configured to observe the one or more vehicles 22 and the first, second and third reference points, $30_A$, $30_B$, $30_C$ within a second field of view 55, the second camera 50 being further configured to produce a second output signal 54 from the observed vehicles 22 and reference points 30, wherein the second output signal 54 is representative of a second two-dimensional image 68 of the control volume 24 as viewed from the second camera 50; (iii) a processor 60 operatively connected with the first and second cameras 40, 50 and configured to determine a respective spatial position SP for each of the one or more vehicles 22 from the first and second output signals 44, 54, and (iv) a transmitter 70 operatively connected with the processor 60 and configured to transmit one or more messages 72 into the control volume 24, wherein the one or more messages 72 contain a respective set of three-dimensional spatial coordinates 69 for each of the one or more vehicles 22.

Figure 8:
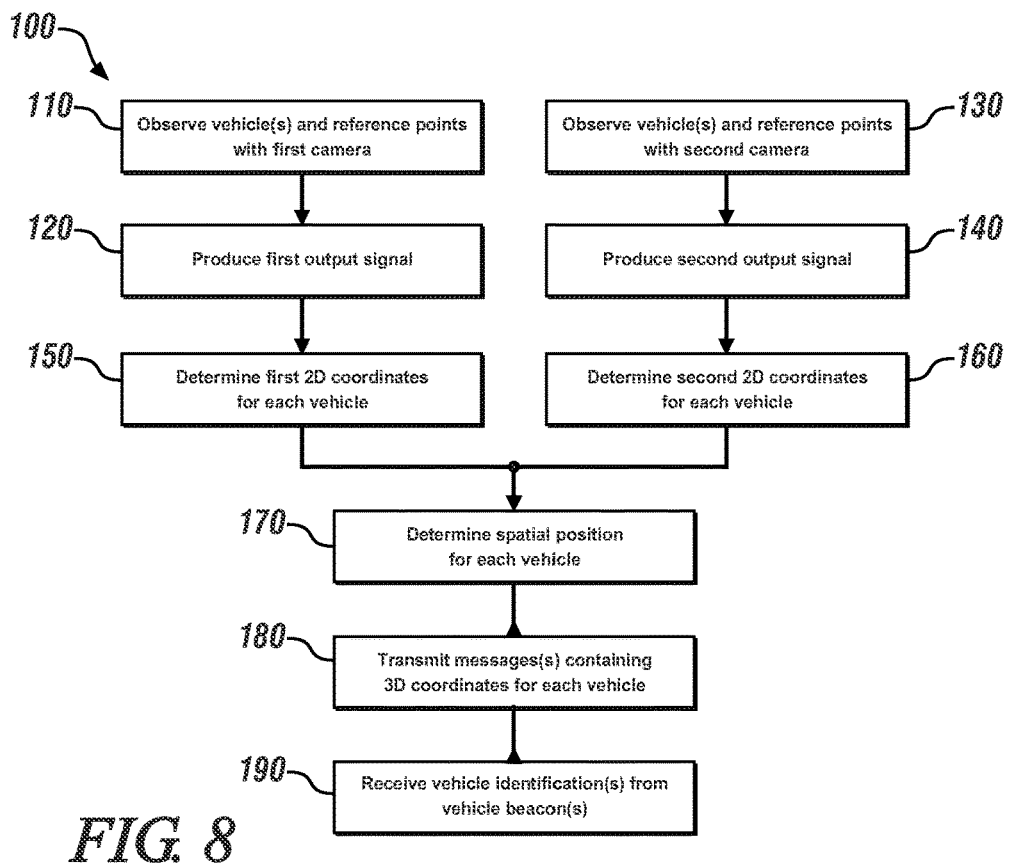
FIG. 8 is a flowchart for a method of navigation utilizing a navigation system according to first and second embodiments of the present disclosure.

As illustrated by the flowchart of FIG. 8, a method 100 of navigation for one or more vehicles 22 located within a control volume 24 is also provided. At step 110, the one or more vehicles 22 are observed with a first camera 40, along with first, second and third reference points $30_A$, $30_B$, $30_C$, within a first field of view 45, wherein the first, second and third reference points $30_A$, $30_B$, $30_C$ have first, second and third known spatial positions $SP_A$, $SP_B$, $SP_C$, respectively. At step 120, a first output signal 44 is produced by the first camera 40 from the observed vehicles 22 and reference points 30. At step 130, the one or more vehicles 22 and the first, second and third reference points $30_A$, $30_B$, $30_C$ are observed within a second field of view 55 with a second camera 50. At step 140, a second output signal 54 from the observed vehicles 22 and reference points 30 is produced by the second camera 50. And at step 170, a respective three-dimensional spatial position SP for each vehicle 22 is determined, from the first and second output signals 44, 54, by a processor 60 operatively connected with the first and second cameras 40, 50.

The method 100 of navigation may further include one or more additional steps. For example, at step 150, respective first two-dimensional coordinates 61 may be determined for each of the one or more vehicles 22 using the first output signal 44 and the first, second and third known spatial positions $SP_A$, $SP_B$, $SP_C$, and similarly at step 160, respective second two-dimensional coordinates 63 may be determined for each vehicle 22 using the second output signal 54 and the first, second and third known spatial positions $SP_A$, $SP_B$, $SP_C$. At step 180, one or more messages 72 may be transmitted into the control volume 24, wherein the one or more messages 72 contain a respective set of three-dimensional spatial coordinates 69 for each vehicle 22. And at step 190, a respective vehicle identification 21 may be received (e.g., by the first and/or second camera 40, 50), which is transmitted from a respective vehicle beacon or transponder 29 carried aboard each of the one or more vehicles 22.

In addition to the first embodiment illustrated in FIGS. 1, 3 and 6 in which two cameras 40, 50 and three reference points $30_A$, $30_B$, $30_C$ having known spatial positions $SP_A$, $SP_B$, $SP_C$ are used, the navigation system 20 and method 100 may also include three other different but related embodiments. These include: (i) a second embodiment in which two cameras 40, 50 and two reference points $30_A$, $30_B$ having known spatial positions $SP_A$, $SP_B$ are used, along with known first and second spatial positions $SP_{40}$, $SP_{50}$ for the cameras 40, 50; (ii) a third embodiment in which one camera 40, one transceiver 51 and three reference points $30_A$, $30_B$, $30_C$ having known spatial positions $SP_A$, $SP_B$, $SP_C$ are used; and (iii) a fourth embodiment in which one camera 40, one transceiver 51 and two reference points $30_A$, $30_B$ having known spatial positions $SP_A$, $SP_B$ are used, along with known first and second spatial positions $SP_{40}$, $SP_{51}$ for the camera 40 and transceiver 51. These four embodiments are summarized below in TABLE 1.

TABLE 1

Comparison of Embodiments

Figure 4:
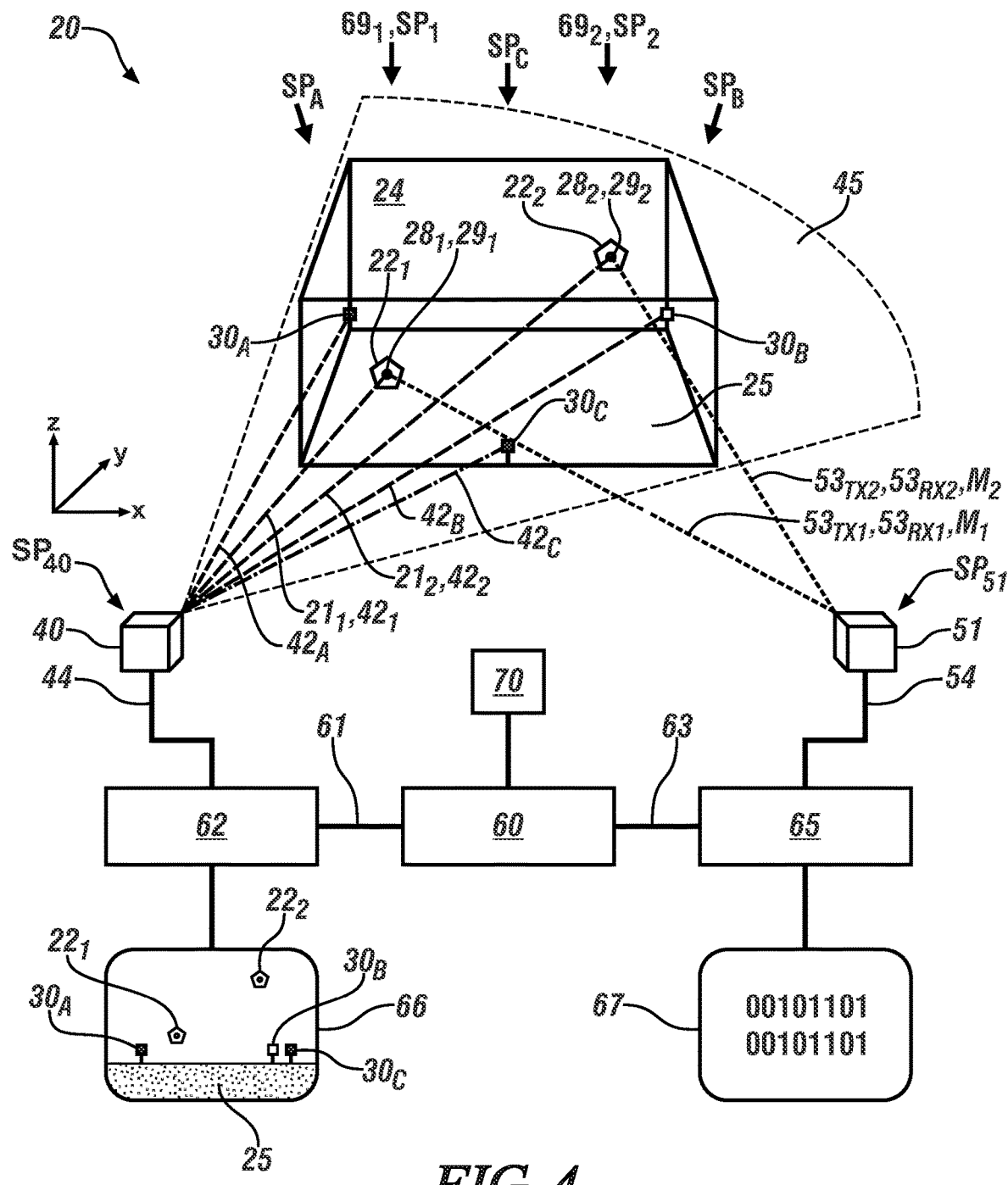
FIG. 4 is a front perspective schematic view and block diagram of third and fourth embodiments of a navigation system.
Figure 9:
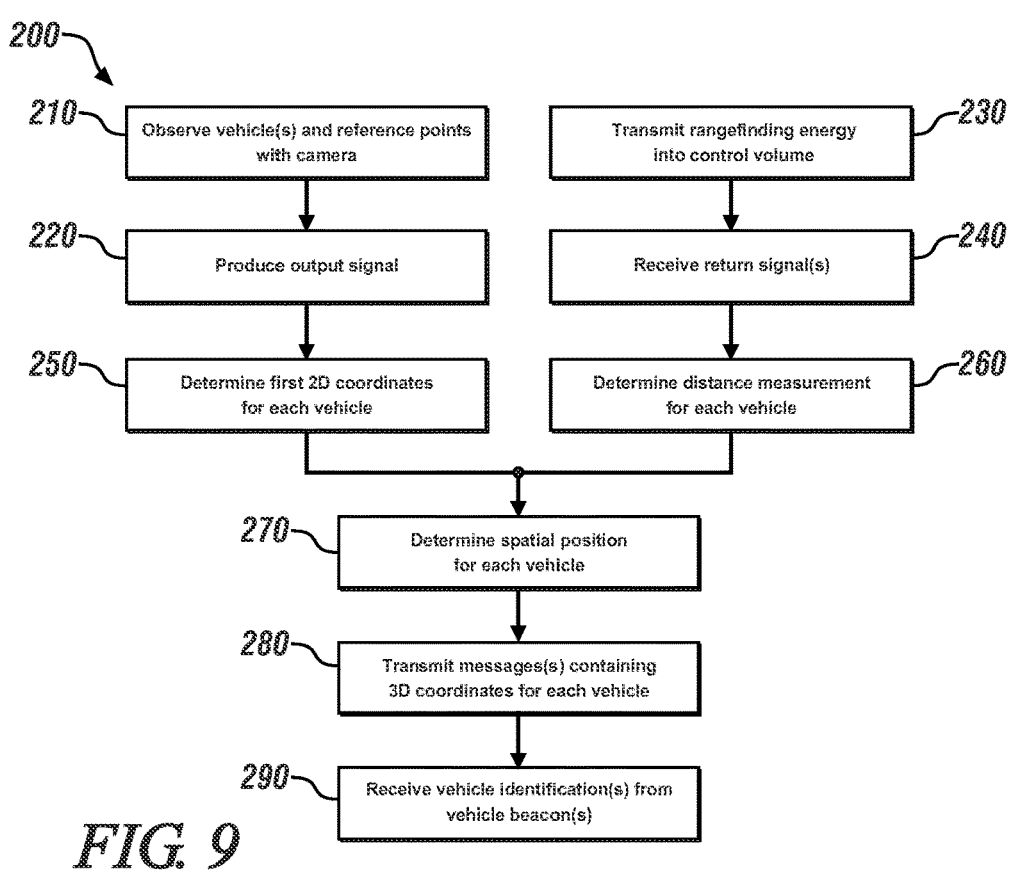
FIG. 9 is a flowchart for a method of navigation utilizing a navigation system according to third and fourth embodiments of the present disclosure.

| Embodiment | First Receiver | Second Receiver | Known Spatial Positions | | Related Drawings | |
|---|---|---|---|---|---|---|
| | | | Reference Points | Receivers | Navigation System 20 | Method 100, 200 |
| First | Camera 40 | Camera 50 | $SP_A$, $SP_B$, $SP_C$ | — | FIGS. 1, 3, 6 | FIG. 8 |
| Second | Camera 40 | Camera 50 | $SP_A$, $SP_B$ | $SP_{40}$, $SP_{50}$ | FIGS. 1, 3, 6 | FIG. 8 |
| Third | Camera 40 | Transceiver 51 | $SP_A$, $SP_B$, $SP_C$ | — | FIGS. 4, 5, 7 | FIG. 9 |
| Fourth | Camera 40 | Transceiver 51 | $SP_A$, $SP_B$ | $SP_{40}$, $SP_{51}$ | FIGS. 4, 5, 7 | FIG. 9 |

As used herein, a transceiver 51 is configured to both (i) transmit EM/rangefinding energy $53_{TX}$ and (ii) receive EM/rangefinding energy $53_{RX}$ in the form of a return signal reflected or evinced from other objects in the control volume 24 (such as vehicles 22). For example, the transceiver 51 and the transmitted EM/rangefinding energy $53_{TX}$ may be, respectively: a distance measuring equipment (DME) device and radio waves, a radar device and radar waves, a sonar device and sonar waves, or a laser rangefinder and coherent laser light. Note that the received EM energy/return signal $53_{RX}$ may have the same wavelength as the transmitted EM energy $53_{TX}$, or it may have a different wavelength. In the third and fourth embodiments, the transceiver 51 may be manually or automatically directed at each vehicle 22 within the control volume 24 in order to determine or "range find" a distance M from the transceiver 51 to each vehicle 22. For example, $M_1$ and $M_2$ are shown in the drawings to represent the respective distances from the transceiver 51 to the first and second vehicles $22_1$, $22_2$. A first beam of EM energy $53_{TX1}$ may be directed at a first vehicle $22_1$ and a return signal of EM energy $52_{RX1}$ received back from the vehicle $22_1$ by the transceiver 51; then, a second beam of EM energy $53_{TX2}$ may be directed at a second vehicle $22_2$ and a return signal of EM energy $52_{RX2}$ received back from the vehicle $22_2$ by the transceiver 51.

Note that the transceiver 51 does not necessarily have to transmit and receive EM energy $53_{TX}$, $53_{RX}$ from the very same device, but may include a transmitting portion and a receiving portion that are partially or entirely separate from each other, but which together comprise a transceiver 51. The transceiver 51 may be configured to use the transmitted and received EM energy $53_{TX}$, $53_{RX}$ to determine the distance M from the transceiver 51 to targeted objects (such as each vehicle 22), or the transceiver 51 may communicate with another device external to the transceiver 51, such as a distance determination system or device 65, which utilizes signals from the transceiver 51 to calculate or determine the distance M.

In the second embodiment, two cameras 40, 50 and two reference points $30_A$, $30_B$ having known spatial positions $SP_A$, $SP_B$ are used, along with known first and second spatial positions $SP_{40}$, $SP_{50}$ for the cameras 40, 50. In this embodiment, as illustrated in FIGS. 1, 3 and 6, a navigation system 20 for one or more vehicles 22 located within a control volume 24 includes: a first camera 40 configured to observe the one or more vehicles 22 and first and second reference points $30_A$, $30_B$ within a first field of view 45, wherein the first and second reference points $30_A$, $30_B$ have first and second known spatial positions $SP_A$, $SP_B$, respectively, the first camera 40 having a known first camera spatial position $SP_{40}$ and being further configured to produce a first output signal 44 from the observed vehicles 22 and reference points 30; a second camera 50 configured to observe the one or more vehicles 22 and the first and second reference points $30_A$, $30_B$ within a second field of view 55, the second camera 50 having a known second camera spatial position $SP_{50}$ and being further configured to produce a second output signal 54 from the observed vehicles 22 and reference points 30; and a processor 60 operatively connected with the first and second cameras 40, 50 and configured to determine a respective spatial position SP for each of the one or more vehicles 22 from the first and second output signals 44, 54 and from the known first and second camera spatial positions $SP_{40}$, $SP_{50}$.

In this second embodiment, each of the known first and second camera spatial positions $SP_{40}$, $SP_{50}$ may be a respective set of x, y and z coordinates. The navigation system 20 may further include: (i) a first real-time tracking system 62 operatively connected with the first camera 40 for determining respective first two-dimensional coordinates 61 of each of the one or more vehicles 22 using the first output signal 44, the first and second known spatial positions $SP_A$, $SP_B$, and the known first camera spatial position $SP_{40}$; and (ii) a second real-time tracking system 64 operatively connected with the second camera 50 for determining respective second two-dimensional coordinates 63 of each of the one or more vehicles 22 using the second output signal 54, the first and second known spatial positions $SP_A$, $SP_B$, and the known second camera spatial position $SP_{50}$. This second embodiment may also include any of the relevant subject matter of dependent claims 2-7 and 9-10 as originally filed.

As illustrated in FIG. 8, in this second embodiment, a method 100 of navigation for one or more vehicles 22 located within the control volume 24 includes: (i) at step 110, observing, with a first camera 40 having a known first camera spatial position $SP_{40}$, the one or more vehicles 22 and first and second reference points $30_A$, $30_B$ within the first field of view 45, wherein the first and second reference points $30_A$, $30_B$ have first and second known spatial positions $SP_A$, $SP_B$, respectively; (ii) at step 120, producing, by the first camera 40, a first output signal 44 from the observed vehicles 22 and reference points 30; (iii) at step 130, observing, with a second camera 50 having a known second camera spatial position $SP_{50}$, the one or more vehicles 22 and the first and second reference points $30_A$, $30_B$ within the second field of view 55; (iv) at step 140, producing, by the second camera 50, a second output signal 54 from the observed vehicles 22 and reference points 30; and (v) at step 170, determining, by a processor 60 operatively connected with the first and second cameras 40, 50, a respective spatial position SP for each of the one or more vehicles 22 from the first and second output signals 44, 54 and from the known first and second camera spatial positions $SP_{40}$, $SP_{50}$.

The method 100 of the second embodiment may further include one or more of: (vi) at step 150, determining respective first two-dimensional coordinates 61 of each of the one or more vehicles 22 using the first output signal 44, the first and second known spatial positions $SP_A$, $SP_B$, and the known first camera spatial position $SP_{40}$; (vii) at step 160, determining respective second two-dimensional coordinates 63 of each of the one or more vehicles 22 using the second output signal 54, the first and second known spatial positions $SP_A$, $SP_B$, and the known second camera spatial position $SP_{50}$; (viii) at step 180, transmitting one or more messages 72 into the control volume 24, wherein the one or more messages 72 contain a respective set of three-dimensional spatial coordinates 69 for each of the one or more vehicles 22; and (ix) at step 190, receiving a respective vehicle identification 21 transmitted from a respective vehicle beacon 29 carried aboard each of the one or more vehicles 22.

In the third embodiment, one camera 40, one transceiver 51 and three reference points $30_A$, $30_B$, $30_C$ having known spatial positions $SP_A$, $SP_B$, $SP_C$ are used. In this embodiment, as illustrated in FIGS. 4, 5 and 7, a navigation system 20 for one or more vehicles 22 located within a control volume 24 includes: a camera 40 configured to observe the one or more vehicles 22 and first, second and third reference points $30_A$, $30_B$, $30_C$ within a first field of view 45, wherein the first, second and third reference points $30_A$, $30_B$, $30_C$ have first, second and third known spatial positions $SP_A$, $SP_B$, $SP_C$, respectively, the camera 40 being further configured to produce an output signal 44 from the observed vehicles 22 and reference points 30; a transceiver 51 configured to transmit rangefinding energy $53_{TX}$ into the control volume 24 and to receive a respective return signal $53_{RX}$ from each of the one or more vehicles 22 indicative of a respective distance measurement M from the transceiver 51 to each respective vehicle 22; and a processor 60 operatively connected with the camera 40 and transceiver 51 and configured to determine a respective spatial position SP for each of the one or more vehicles 22 from the output signal 44 and from at least one of the respective return signal $53_{RX}$ and the respective distance measurement M.

In this third embodiment, the output signal 44 may be representative of a two-dimensional image 66 of the control volume 24 as viewed from the camera 40. As illustrated in FIGS. 5 and 7, the camera 40 and transceiver 51 may be disposed generally side-by-side with each other, such that a central ray 46 of the field of view 45 of the camera 40 and the one or more beams of EM energy $53_{TX}$, $53_{RX}$ of the transceiver 51 are generally pointing in the same direction as each other. (Here, "side-by-side" also includes the camera 40 and transceiver 51 being at different heights from each such, such as the transceiver 51 being disposed above or below the camera 40.) The navigation system 20 may further include: (i) a real-time tracking system 62 operatively connected with the camera 40 for determining respective first two-dimensional coordinates 61 of each of the one or more vehicles 22 using the output signal 44 and the first, second and third known spatial positions $SP_A$, $SP_B$, $SP_C$; and/or (ii) a distance determination system 65 operatively connected with the transceiver 51 for determining a respective distance M from the transceiver 51 to each of the one or more vehicles 22 using the respective return signals $53_{RX}$ from each of the one or more vehicles 22. This third embodiment may also include any of the relevant subject matter of dependent claims 2, 5, 7 and 9-10 as originally filed.

As illustrated in FIG. 9, in this third embodiment, a method 200 of navigation for one or more vehicles 22 located within the control volume 24 includes: (i) at step 210, observing, with a camera 40, the one or more vehicles 22 and first, second and third reference points $30_A$, $30_B$, $30_C$ within a first field of view, wherein the first, second and third reference points $30_A$, $30_B$, $30_C$ have first, second and third known spatial positions $SP_A$, $SP_B$, $SP_C$, respectively; (ii) at step 220, producing, by the camera 40, an output signal 44 from the observed vehicles 22 and reference points 30; (iii) at step 230, transmitting, by a transceiver 51, rangefinding energy $53_{TX}$ into the control volume 24 (e.g., at each of the one or more vehicles 22); (iv) at step 240, receiving, by the transceiver 51, a respective return signal $53_{RX}$ from each of the one or more vehicles 22 indicative of a respective distance measurement M from the transceiver 51 to each respective vehicle 22; and; (v) at step 270, determining, by a processor 60 operatively connected with the camera 40 and transceiver 51, a respective spatial position SP for each of the one or more vehicles 22 from the output signal 44 and from at least one of the respective return signal $53_{RX}$ and the respective distance measurement M.

The method 200 of the third embodiment may further include one or more of: (vi) at step 250, determining respective first two-dimensional coordinates 61 of each of the one or more vehicles 22 using the output signal 44 and the first, second and third known spatial positions $SP_A$, $SP_B$, $SP_C$; (vii) at step 260, determining a distance measurement M from the transceiver 51 to each of the one or more vehicles 22 using the respective return signals $53_{RX}$; (viii) at step 280, transmitting one or more messages 72 into the control volume 24, wherein the one or more messages 72 contain a respective set of three-dimensional spatial coordinates 69 for each of the one or more vehicles 22; and (ix) at step 290, receiving a respective vehicle identification 21 transmitted from a respective vehicle beacon 29 carried aboard each of the one or more vehicles 22.

In the fourth embodiment, one camera 40, one transceiver 51 and two reference points $30_A$, $30_B$ having known spatial positions $SP_A$, $SP_B$ are used, along with known first and second spatial positions $SP_{40}$, $SP_{51}$ for the camera 40 and transceiver 51. In this embodiment, as illustrated in FIGS. 4, 5 and 7, a navigation system 20 for one or more vehicles 22 located within a control volume 24 includes: a camera 40 configured to observe the one or more vehicles 22 and first and second reference points $30_A$, $30_B$ within a first field of view 45, wherein the first and second reference points $30_A$, $30_B$ have first and second known spatial positions, $SP_A$, $SP_B$, respectively, the camera 40 having a known camera spatial position $SP_{40}$ and being further configured to produce an output signal 44 from the observed vehicles 22 and reference points 30; a transceiver 51 having a known transceiver spatial position $SP_{51}$ and being configured to transmit rangefinding energy $53_{TX}$ into the control volume 24 and to receive a respective return signal $53_{RX}$ from each of the one or more vehicles 22 indicative of a respective distance measurement M from the transceiver 51 to each respective vehicle 22; and a processor 60 operatively connected with the camera 40 and transceiver 51 and configured to determine a respective spatial position SP for each of the one or more vehicles 22 from (i) the output signal 44, (ii) at least one of the respective return signal $53_{RX}$ and the respective distance measurement M, and (iii) the known camera and transceiver spatial positions $SP_{40}$, $SP_{51}$.

In this fourth embodiment (and similar to the third embodiment), the output signal 44 may be representative of a two-dimensional image 66 of the control volume 24 as viewed from the camera 40. As illustrated in FIGS. 5 and 7, the camera 40 and transceiver 51 may be disposed generally side-by-side with each other, such that a central ray 46 of the field of view 45 of the camera 40 and the one or more beams of EM energy $53_{TX}$, $53_{RX}$ of the transceiver 51 are generally pointing in the same direction as each other. (Here, "side-by-side" also includes the camera 40 and transceiver 51 being at different heights from each such, such as the transceiver 51 being disposed above or below the camera 40.) The navigation system 20 may further include: (i) a real-time tracking system 62 operatively connected with the camera 40 for determining respective first two-dimensional coordinates 61 of each of the one or more vehicles 22 using the output signal 44 and the first, second and third known spatial positions $SP_A$, $SP_B$, $SP_C$; and/or (ii) a distance determination system 65 operatively connected with the transceiver 51 for determining a respective distance M from the transceiver 51 to each of the one or more vehicles 22 using the respective return signals $53_{RX}$ from each of the one or more vehicles 22. This fourth embodiment may also include any of the relevant subject matter of dependent claims 2, 5, 7 and 9-10 as originally filed.

As illustrated in FIG. 9, in this fourth embodiment, a method 200 of navigation for one or more vehicles 22 located within the control volume 24 includes: (i) at step 210, observing, with a camera 40 having a known camera spatial position $SP_{40}$, the one or more vehicles 22 and first and second reference points $30_A$, $30_B$ within a first field of view 45, wherein the first and second reference points $30_A$, $30_B$ have first and second known spatial positions $SP_A$, $SP_B$, respectively; (ii) at step 220, producing, by the camera 40, an output signal 44 from the observed vehicles 22 and reference points 30; (iii) at step 230, transmitting, by a transceiver 51 having a known transceiver spatial position $SP_{51}$, rangefinding energy $53_{TX}$ into the control volume 24; (iv) at step 240, receiving, by the transceiver 51, a respective return signal $53_{RX}$ from each of the one or more vehicles 22 indicative of a respective distance measurement M from the transceiver 51 to each respective vehicle 22; and; (v) at step 270, determining, by a processor 60 operatively connected with the camera 40 and transceiver 51, a respective spatial position SP for each of the one or more vehicles 22 from (i) the output signal 44, (ii) at least one of the respective return signal $53_{RX}$ and the respective distance measurement M, and (iii) the known camera and transceiver spatial positions $SP_{40}$, $SP_{51}$.

The method 200 of the fourth embodiment may further include one or more of: (vi) at step 250, determining respective first two-dimensional coordinates 61 of each of the one or more vehicles 22 using the output signal 44, the first and second known spatial positions $SP_A$, $SP_B$, and the known camera spatial position $SP_{40}$; (vii) at step 260, determining a distance measurement M from the transceiver 51 to each of the one or more vehicles 22 using the respective return signals $53_{RX}$; (viii) at step 280, transmitting one or more messages 72 into the control volume 24, wherein the one or more messages 72 contain a respective set of three-dimensional spatial coordinates 69 for each of the one or more vehicles 22; and (ix) at step 290, receiving a respective vehicle identification 21 transmitted from a respective vehicle beacon 29 carried aboard each of the one or more vehicles 22.

In the third and fourth embodiments, the transceiver 51 may produce an output signal 54 representative of or containing the distance measurement(s) M from the transceiver 51 to each vehicle 22 within the control volume 24 which has been targeted by the transceiver 51. (Here "targeted" it is meant that rangefinding EM energy $53_{TX}$ has been transmitted or directed at a vehicle 22 and a return signal of EM energy $53_{RX}$ has been received back from the vehicle 22 by the transceiver 51.) The distance measurement(s) M may be displayed, manipulated or characterized as human-readable alphanumeric information or as machine-readable information (e.g., binary code, hexadecimal code, sequences and amplitudes of varying voltages, etc.), as represented by reference numeral 67 in FIGS. 4, 5 and 7.

Note that in any of the embodiments above, each of the control volume 24, the first, second and third reference points $30_A$, $30_B$, $30_C$, the first and second cameras/receivers 40, 50 and the transceiver 51 may be configured to be stationary or moving (e.g., with respect to the origin 26). Also, over time the control volume 24 may expand and/or contract in size and may change in shape. When one or more of the control volume 24, the reference points 30, the cameras/receivers 40, 50 and the transceiver 51 is/are moving (whether translationally, rotationally or otherwise), it may be necessary to know or determine one or more vectors, motion paths (versus time) and/or other data and information relating to one or more of the moving and stationary objects in order to determine the spatial positions SP of each vehicle 22 within the control volume 24.

The above description is intended to be illustrative, and not restrictive. While the dimensions and types of materials described herein are intended to be illustrative, they are by no means limiting and are exemplary embodiments. In the following claims, use of the terms "first", "second", "top", "bottom", etc. are used merely as labels, and are not intended to impose numerical or positional requirements on their objects. As used herein, an element or step recited in the singular and preceded by the word "a" or "an" should be understood as not excluding plural of such elements or steps, unless such exclusion is explicitly stated. Also, elements of some embodiments may be added to other embodiments or substituted for other elements in such other embodiments. Additionally, the phrase "at least one of A and B" and the phrase "A and/or B" should each be understood to mean "only A, only B, or both A and B". Moreover, unless explicitly stated to the contrary, embodiments "comprising" or "having" an element or a plurality of elements having a particular property may include additional such elements not having that property. And when broadly descriptive adverbs such as "substantially" and "generally" are used herein to modify an adjective, these adverbs mean "for the most part", "to a significant extent" and/or "to a large degree", and do not necessarily mean "perfectly", "completely", "strictly" or "entirely". Additionally, the word "proximate" may be used herein to describe the location of an object or portion thereof with respect to another object or portion thereof, and/or to describe the positional relationship of two objects or their respective portions thereof with respect to each other, and may mean "near", "adjacent", "close to", "close by", "at" or the like.

The flowcharts and block diagrams in the drawings illustrate the architecture, functionality and/or operation of possible implementations of systems, methods and computer program products according to various embodiments of the present disclosure. In this regard, each block in the flowchart or block diagrams may represent a module, segment or portion of code, which includes one or more executable instructions for implementing the specified logical function(s). It will also be noted that each block of the block diagrams and/or flowchart illustrations, and combinations of blocks in the block diagrams and/or flowchart illustrations, may be implemented by hardware-based systems that perform the specified functions or acts, or combinations of hardware and computer instructions. These computer program instructions may also be stored in a computer-readable medium that can direct a controller or other programmable data processing apparatus to function in a particular manner, such that the instructions stored in the computer-readable medium produce an article of manufacture including instructions to implement the functions and/or actions specified in the flowcharts and block diagrams.

This written description uses examples, including the best mode, to enable those skilled in the art to make and use devices, systems and compositions of matter, and to perform methods, according to this disclosure. It is the following claims, including equivalents, which define the scope of the present disclosure.

What is claimed is:

1. A navigation system for one or more vehicles located within a control volume, comprising:
    a first camera configured to observe the one or more vehicles and first and second reference points within a first field of view, wherein the first and second reference points have first and second known spatial positions, respectively, the first camera having a known first camera spatial position and being further configured to produce a first output signal from the observed one or more vehicles and the first and second reference points;
    a second camera configured to observe the one or more vehicles and the first and second reference points within a second field of view, the second camera having a known second camera spatial position and being further configured to produce a second output signal from the observed one or more vehicles and the first and second reference points; and
    a processor operatively connected with the first and second cameras and configured to determine a respective spatial position for each of the one or more vehicles from the first and second output signals and from the known first and second camera spatial positions;
    wherein the one or more vehicles and the control volume are, respectively, one or more aircraft and a landing zone including a first airspace above the landing zone, one or more ground vehicles and an area of terrain including a second airspace above the terrain, one or more surface watercraft and a region of open water including a third airspace above the open water, one or more submersible watercraft and a volume of navigable water, or one or more spacecraft and a volume of navigable space.

2. The navigation system of claim 1, wherein each of the known first and second camera spatial positions is a respective set of x, y and z coordinates.

3. The navigation system of claim 1, further comprising:
    a first real-time tracking system operatively connected with the first camera for determining respective first two-dimensional coordinates of each of the one or more vehicles using the first output signal, the first and second known spatial positions, and the known first camera spatial position; and
    a second real-time tracking system operatively connected with the second camera for determining respective second two-dimensional coordinates of each of the one or more vehicles using the second output signal, the first and second known spatial positions, and the known second camera spatial position.

4. The navigation system of claim 1, wherein each of the first and second known spatial positions is a respective set of x, y and z coordinates.

5. The navigation system of claim 1, wherein each of the first and second known spatial positions is known with respect to an origin located within the control volume.

6. The navigation system of claim 1, wherein each of the first and second cameras is configured to detect at least one of visible light, infrared light and ultraviolet light.

7. The navigation system of claim 1, wherein the first and second cameras are disposed such that their respective fields of view are generally orthogonal with each other.

8. The navigation system of claim 1, wherein each of the first and second reference points is (i) a respective point on a respective physical object disposed within the control volume and/or (ii) a respective focal point of a respective reference point beacon disposed within the control volume.

9. The navigation system of claim 1, wherein the first output signal is representative of a first two-dimensional image of the control volume as viewed from the first camera, and wherein the second output signal is representative of a second two-dimensional image of the control volume as viewed from the second camera.

10. The navigation system of claim 1, further comprising:
    a transmitter operatively connected with the processor and configured to transmit one or more messages into the control volume, wherein the one or more messages contain a respective set of three-dimensional spatial coordinates for each of the one or more vehicles.

11. The navigation system of claim 1, further comprising:
    a respective vehicle beacon configured to be carried aboard each of the one or more vehicles, wherein each vehicle beacon is configured to transmit a respective vehicle identification.

12. A system for one or more vehicles located within a control volume, comprising:
    a first camera configured to observe the one or more vehicles and first and second reference points within a first field of view, wherein the first and second reference points have first and second known spatial positions, respectively, wherein each of the first and second known spatial positions is known with respect to an origin located within the control volume, the first camera having a known first camera spatial position and being further configured to produce a first output signal from the observed one or more vehicles and the first and second reference points, wherein the first output signal is representative of a first two-dimensional image of the control volume as viewed from the first camera;
    a second camera configured to observe the one or more vehicles and the first and second reference points within a second field of view, the second camera having a known second camera spatial position and being further configured to produce a second output signal from the observed one or more vehicles and the first and second reference points, wherein the second output signal is representative of a second two-dimensional image of the control volume as viewed from the second camera;
    a processor operatively connected with the first and second cameras and configured to determine a respective spatial position for each of the one or more vehicles from the first and second output signals and from the known first and second camera spatial positions; and
    a transmitter operatively connected with the processor and configured to transmit one or more messages into the control volume, wherein the one or more messages contain a respective set of three-dimensional spatial coordinates for each of the one or more vehicles;
    wherein the one or more vehicles and the control volume are, respectively, one or more aircraft and a landing zone including a first airspace above the landing zone, one or more ground vehicles and an area of terrain including a second airspace above the terrain, one or more surface watercraft and a region of open water including a third airspace above the open water, one or more submersible watercraft and a volume of navigable water, or one or more spacecraft and a volume of navigable space.

13. The system of claim 12, wherein the first and second cameras are disposed such that their respective fields of view are generally orthogonal with each other.

14. The system of claim 12, further comprising:
a respective vehicle beacon configured to be carried aboard each of the one or more vehicles, wherein each vehicle beacon is configured to transmit a respective vehicle identification.

15. The system of claim 12, further comprising:
a first real-time tracking system operatively connected with the first camera for determining respective first two-dimensional coordinates of each of the one or more vehicles using the first output signal, the first and second known spatial positions, and the known first camera spatial position; and
a second real-time tracking system operatively connected with the second camera for determining respective second two-dimensional coordinates of each of the one or more vehicles using the second output signal, the first and second known spatial positions, and the known second camera spatial position.

16. A method of navigation for one or more vehicles located within a control volume, comprising:
observing, with a first camera having a known first camera spatial position, the one or more vehicles and first and second reference points within a first field of view, wherein the first and second reference points have first and second known spatial positions, respectively;
producing, by the first camera, a first output signal from the observed one or more vehicles and the first and second reference points;
observing, with a second camera having a known second camera spatial position, the one or more vehicles and the first and second reference points within a second field of view;
producing, by the second camera, a second output signal from the observed one or more vehicles and the first and second reference points; and
determining, by a processor operatively connected with the first and second cameras, a respective spatial position for each of the one or more vehicles from the first and second output signals and from the known first and second camera spatial positions;
wherein the one or more vehicles and the control volume are, respectively, one or more aircraft and a landing zone including a first airspace above the landing zone, one or more ground vehicles and an area of terrain including a second airspace above the terrain, one or more surface watercraft and a region of open water including a third airspace above the open water, one or more submersible watercraft and a volume of navigable water, or one or more spacecraft and a volume of navigable space.

17. The method of claim 16, further comprising:
determining respective first two-dimensional coordinates of each of the one or more vehicles using the first output signal, the first and second known spatial positions, and the known first camera spatial position; and
determining respective second two-dimensional coordinates of each of the one or more vehicles using the second output signal, the first and second known spatial positions, and the known second camera spatial position.

18. The method of claim 16, further comprising:
transmitting one or more messages into the control volume, wherein the one or more messages contain a respective set of three-dimensional spatial coordinates for each of the one or more vehicles.

19. The method of claim 16, further comprising:
receiving a respective vehicle identification transmitted from a respective vehicle beacon carried aboard each of the one or more vehicles.

\* \* \* \* \*